March 24, 1964  H. H. SHAW ETAL  3,126,112
AIRPLANE CARGO AND SERVICE VEHICLE
Filed Dec. 30, 1958  2 Sheets-Sheet 1
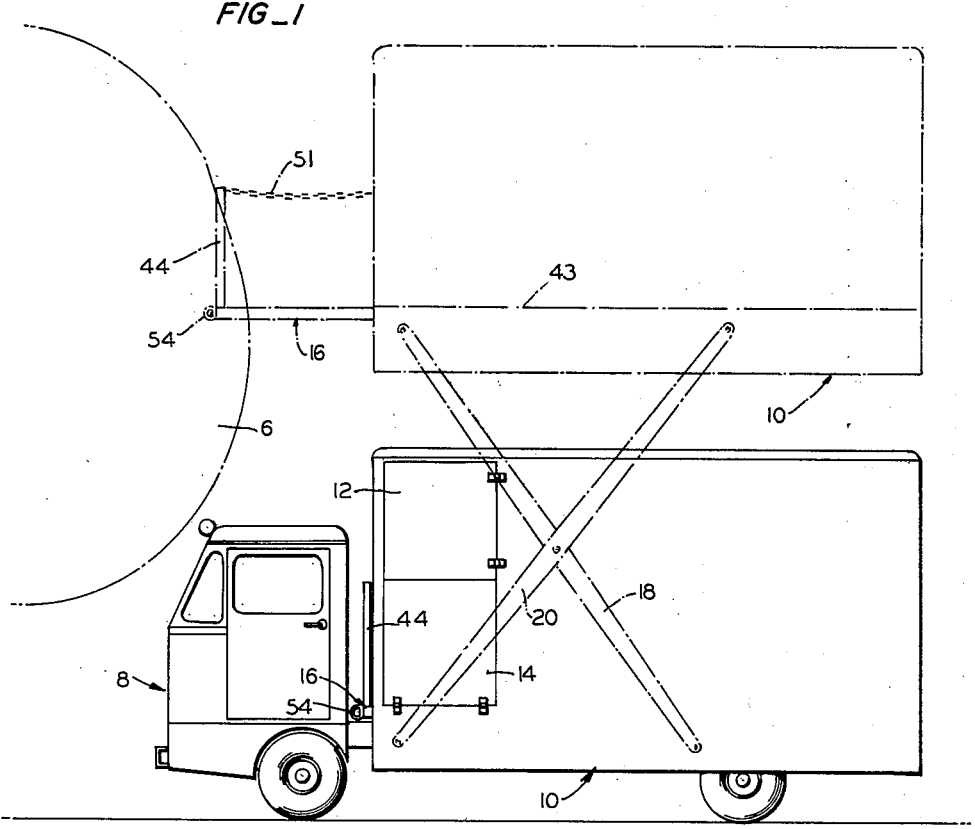
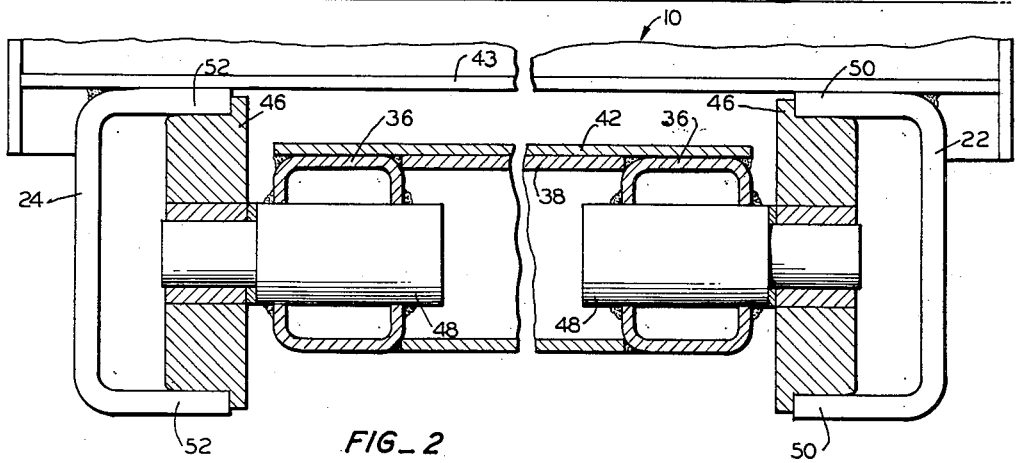
INVENTORS
HUGH H. SHAW
HAROLD G. BRADSHAW
BY Naylor & Neal
ATTORNEYS March 24, 1964  H. H. SHAW ETAL  3,126,112
AIRPLANE CARGO AND SERVICE VEHICLE
Filed Dec. 30, 1958  2 Sheets-Sheet 2
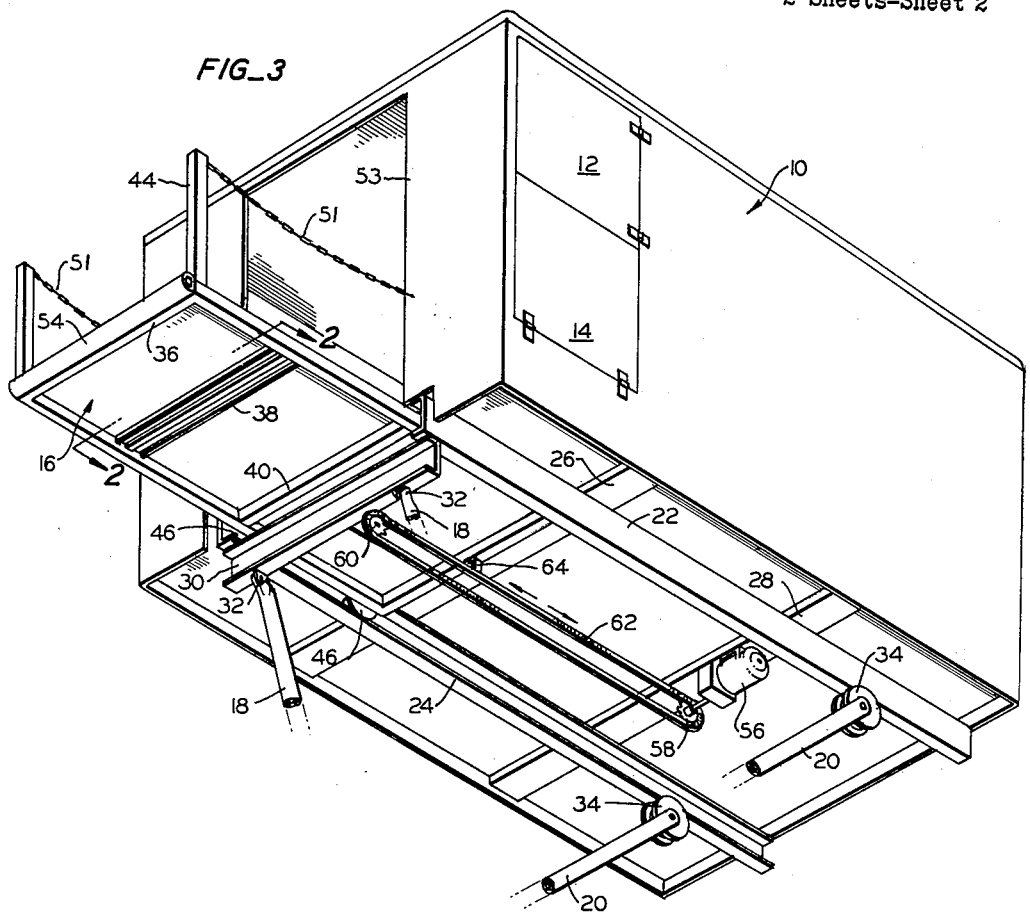
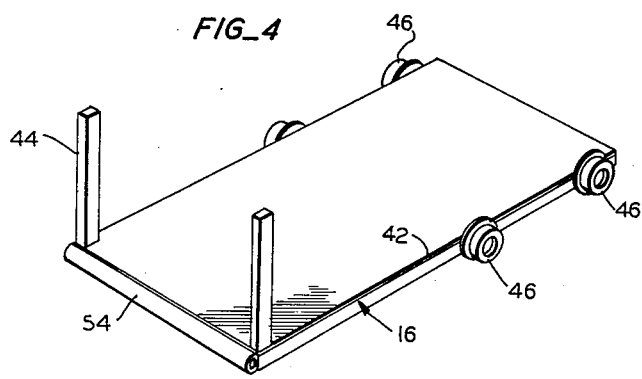
INVENTORS
HUGH H. SHAW
HAROLD G. BRADSHAW
BY Naylor & Neal
ATTORNEYS

United States Patent Office 3,126,112
Patented Mar. 24, 1964

3,126,112
AIRPLANE CARGO AND SERVICE VEHICLE
Hugh H. Shaw and Harold G. Bradshaw, Salinas, Calif., assignors to Cochran Equipment Company, Salinas, Calif., a corporation of California
Filed Dec. 30, 1958, Ser. No. 783,906
7 Claims. (Cl. 214—512)

This invention pertains in general to load carrying vehicles, and more particularly, to a vehicle well adapted for use in the loading and servicing of airplanes through incorporation therein of an elevatable cargo carrying body and a horizontally extensible ramp therefor.

In the loading and servicing of airplanes, it is common practices to employ vehicles which incorporate means for elevating the cargo carrying vehicle body to a suitable level for discharging the body contents into an airplane fuselage when the vehicle is positioned therebelow, such an arrangement being shown in Patent No. 2,412,158, issued December 3, 1946, to N. V. Kuehlman et al. Provision of the elevatable cargo body permits ground level loading and unloading, eliminating the need for auxiliary equipment, and reducing the manual effort required in the airplane loading and discharging operations. However, in certain types of these vehicles it is necessary that the cargo body, after proper elevation, be horizontally projected into a position for cargo discharge closely adjacent to, or in an abutment with, the skin of the airplane fuselage. This is achieved by moving the cargo body relative to the supporting vehicle after the latter has been positioned adjacent the airplane near its cargo receiving hatchway, or by moving the vehicle and its cargo body as a unit. In view of the fragile nature of the fuselage skin, and the weight of the units involved in such movement, there is the obvious attendant danger of impact damage should the cargo body strike such airplane fuselage.

Accordingly, it is an object of this invention to provide loading means adapted for installation upon an airplane cargo and service vehicle having an elevatable cargo body which loading means will, through utilization of a relatively lightweight load-supporting extensible ramp carried by said body, eliminate the necessity for moving the considerable mass of the cargo body, or the even greater mass of the vehicle and cargo body, into a final loading or discharging position closely adjacent the airplane fuselage, thereby considerably reducing the above danger of impact damage to the airplane fuselage.

Another object of this invention is to provide an elevatable cargo body and an extensible relatively lightweight load-supporting ramp therefor which is adapted to extend into a cantilevered delivery or discharge position closely adjacent to, or in abutting relationship with, an airplane fuselage and which, because of its lightweight, is easily driven into extended and contracted positions and requires a minimum of structural provisions for its support.

Still another object of the invention is the provision of a ramp for an elevatable cargo body which ramp, together with its support and driving means, is of relatively lightweight and simple construction and easy and inexpensive of manufacture.

Additional objects and advantages of this invention will become apparent from the following description, when taken in conjunction with the drawings in which:

FIGURE 1 is a view in elevation showing the cargo body and vehicle positioned adjacent the fuselage of an airplane with the discharge position of the cargo body and its extensible ramp being indicated in phantom outline.

FIGURE 2 is a view in section indicating in detail the means of support for the extensible ramp.

FIGURE 3 is a view in perspective of the cargo body and the ramp positioned as for discharge.

FIGURE 4 is a view in perspective of the ramp together with its flanged supporting wheels.

In FIGURE 1 there is shown positioned adjacent an airplane fuselage 6, illustrated in profile, an airplane cargo and service vehicle 8 having a cab 9 and an enclosed cargo body 10 with side opening doors 12 and 14, said body carrying a horizontally disposed load supporting extensible ramp 16. Although the invention is illustrated as embodied upon a truck 8, of more or less conventional design, with a cab 9 provided for the truck operator, the invention is not necessarily limited thereto, but may in fact be incorporated in a wide variety of vehicles. However, where incorporated with a vehicle such as 8 having a control cab 9, it is desirable that certain safety provisions be included, as more fully described hereinafter, to prevent interference of the cab with operation of the extensible ramp 16. The body 10 is elevatable above the truck 8 by any of a number of known means; however, for purposes of illustration, there is shown therefor, in phantom outline, a scissors lift hoist assembly comprised of a pair of spaced apart interconnected lift members 18 pivoted at their upper ends to the underside of the cargo body 10, and a second pair of spaced apart and interconnected lift members 20 pivoted at their lower ends to the vehicle frame.

In FIGURE 3, cargo body 10 is shown provided with a horizontally disposed supporting sub-frame comprising spaced apart parallel longitudinal channel members 22 and 24, overlying cross members 26 and 28 secured to and projecting at either end beyond the longitudinal members 22 and 24, and a channel cross member 30 secured in depending relationship between said longitudinal channel members. Lift members 18 of the cargo body hoist assembly are pivoted at their upper ends, as at 32, to cross member 30 while the hoist assembly lift members 20 carry at their upper ends for rotation, centrally grooved rollers 34 adapted to track upon the undersides of the longitudinal members 22 and 24 during the raising and lowering of the cargo body.

The load-supporting ramp 16, which comprises a box frame 36 reinforced by cross members 38 and 40, a tread plate 42 and uprights posts 44 secured to said box frame, is slidably received between the channel members 22 and 24 with its tread plate 42 in closely underlying and substantially parallel relationship with the horizontal floor 43 of the cargo body 10. Ramp 16 is supported for horizontal reciprocal movement upon flanged wheels 46, rotatably carried upon axles 48 (FIGURE 2) secured to the box frame 36, and aligned to track between the inturned flanges 50 and 52 of the oppositely disposed channel members 22 and 24. A close fit between the wheels 46 and the said channel member flanges prevents the ramp 16 from slewing and pitching, thereby maintaining the ramp at all times in a horizontal attitude. Thus, in FIGURE 2 the top and bottom of each wheel hub are illustrated in abutting relation with the interior surfaces of the upper and lower flanges 50 and 52, respectively.

At either side of the ramp 16 are provided chains 51 to extend between the posts 44 and points upon the forward wall of the cargo body 10 adjacent discharge opening 53; and a fender or buffer 54, of a resilient material such as rubber, is secured to the forward end of the box frame 36.

Propelling means for reciprocating the ramp 16 between the extended discharge or receiving position of FIGURE 3 and the retracted position of FIGURE 1, comprise a motor 56 preferably electric, carried by cross member 28 and driving through suitable reduction gearing to a drive sprocket 58; an idler sprocket 60 secured for rotation to cross member 30; and a chain 62, entrained about sprockets 58 and 60, upon the upper reach of which is carried a lug 64 fixedly secured at its upper end to the rearward portion of the ramp box frame 36.

For the airplane loading operation, the body 10, positioned as in FIGURE 1, is first loaded with cargo and the truck 8 then driven into a position underlying the airplane fuselage with the front end of the cargo body 10 located sufficiently close to the fuselage to permit extension of the load-supporting ramp 16, as hereinafter described, into a cargo hatchway (not shown) of airplane 6. The cargo body 10 is thereupon raised to a level which will permit horizontal extension of the ramp 16 above cab 9 into a position slightly above the floor (not shown) of the airplane hatchway. Elevation of the body 10 is effected by conventional means such as hydraulic rams (not shown) acting through the pairs of lift members 18 and 20 and causing such members to pivot forwardly, the grooved rollers 34 carried by members 20 tracking upon the undersides of the members 20 and 22 to move forwardly thereof.

With the body 10 in an elevated position, the ramp 16 is projected over the vehicle cab 9 to bridge the gap between the cargo body 10 and the airplane hatchway (not shown) with wheels 46 tracking interiorly of flanges 50 and 52 of channel members 22 and 24 to provide guidance and support for the ramp. Ramp propulsion is effected through motor 56 which acts through drive sprocket 58 driving chain 62 in rotation, and through lug 64, propelling the ramp 16 forwardly of the cargo body into the horizontal loading position indicated in phantom outline in FIGURE 1.

Thus extended, the ramp overlies the floor of the airplane cargo hatchway with its tread plate 42 extending horizontally between the cargo body 10 and said hatchway, the rearward portion of the ramp underlying the forward portion of the horizontal floor 43 of cargo body 10. As previously indicated, the relatively close fit between the wheels 46 and the flanges 50 and 52 assures positive support and guidance for ramp 16 at all times the ramp thus being self-supporting, even when fully extended.

It is desirable that at least one set of controls (not shown) for motor 56 be located in the cargo body 10 in the vicinity of the body discharge opening 53 in order that ramp extension and retraction may be easily controlled visually by an operator in the cargo body. Duplicate controls for motor 56 are also preferably provided in the truck cab 9.

It may be further desired that the control systems for both the ramp and actuating means and the body elevating means incorporate certain safety features to prevent collision between ramp 16 and truck cab 9 should the cargo body 10 not be elevated sufficiently above the top of the cab to permit clearance by the ramp 16 during extension, and also to prevent lowering of the cargo body 10 when the ramp is in an extended or partially extended position above the cab and/or the airplane hatchway. This may be accomplished in a variety of ways, however, an appropriate and conventional method therefor is through insertion in the control systems circuitry of limit switches suitably located for response to the positions of the cargo body, the cab, and the ramp, and serving thereby to prevent extension of the ramp or lowering of the body should such units not be appropriately positioned.

Retraction of the ramp 16 after completion of cargo transfer, is effected by reversing motor 56 and the direction of rotation of chain 62, from that required for ramp extension, thereby propelling the ramp 16 into the retracted position of FIGURE 1 in which it underlies the floor of cargo body 10. The cargo body may thereupon be lowered for reloading and/or discharge of cargo.

The doors 12 and 14 are provided in the cargo body 10 for side discharge and loading of cargo from a passenger loading ramp (not shown) where the airplane is not provided with a separate cargo hatchway, door 14, which pivots about a horizontal axis, in such case serving as a spanning, load-supporting ramp.

It will be appreciated that the embodiment of this invention as hereinafter described may be altered, changed, or modified without departing from the scope of the invention as herein claimed.

What is claimed is:

1. In an airplane loading vehicle having a vehicle frame, a cargo carrying body having a subframe including a pair of spaced apart longitudinal channel members oppositely disposed with their flanges directed inwardly, two pairs of lift arms mounted on said frame with the arms of each pair pivotally connected together intermediate of their ends and with one arm of each pair having an end thereof in rolling engagement with each of said channel members to thereby provide scissors means for lifting said body above said frame, the improvements comprising a load supporting ramp slidably received between and guidably supported by the channel members with the ramp sides in relatively close fitting relationship with the flanges of the respective channel members thereby to maintain the ramp with its upper tread surface substantially parallel with the floor of the cargo carrying body, and means carried by the sub-frame for propelling the ramp between a discharge position with the ramp projecting outwardly of the sub-frame and a retracted position with the ramp closely underlying the floor of the cargo carrying body.

2. The combination of claim 1 wherein the load supporting ramp is carried at either side upon a plurality of flanged wheels the hubs of which are adapted to track between and in close fitting relationship with the flanges of said channel members.

3. The combination of claim 2 wherein said sub-frame includes a first cross member and a second cross member, each of which cross members extends between and is secured to said longitudinal channel members, and wherein said ramp propelling means includes a motor carried by the first cross member, a drive sprocket driven in rotation by said motor, an idler sprocket carried for rotation by the second cross member, and a chain entrained about said sprockets and connected to the load supporting ramp intermediate its ends for propelling said ramp in response to rotation of the chain as effected by said motor.

4. In an airplane loading vehicle having a ground engaging chassis, a cargo carrying body having a floor, and scissors lift means supporting said body on said chassis and including two spaced apart pairs of lift arms with each pair of arms pivotally connected together intermediate of their ends and with each pair of arms having one arm pivotally connected at one end to said body and mounted for longitudinal movement of its other end on said chassis and the other arm pivotally connected at one end to said chassis and mounted for longitudinal movement of its other end on said body, the improved means for supporting said body on said scissors lift means and discharging material from said cargo carrying body which comprises: a pair of parallel longitudinal struts mounted on said body and forming a portion of the sub-floor of said body with said struts having longitudinal flanges thereon facing inwardly toward each other and longitudinal cam surfaces facing downwardly from said body with said other ends of said other arms engaging said cam surfaces on said struts, a load supporting ramp mounted between said struts in telescopic engagement with said flanges on said struts, and means for propelling said ramp longitudinally of said struts between a discharge position with said ramp projecting outwardly from said body and a retracted position with the ramp closely underlying the floor of said body between said struts.

5. In an airplane loading vehicle having a ground engaging chassis, a driver's cab at one end of said chassis, a cargo carrying body having a floor, and scissors lift means supporting said body on said chassis and including two spaced apart pairs of lift arms with each pair of arms pivotally connected together intermediate of their ends and with each pair of arms having one arm pivotally connected at one end to said body and mounted for longitudinal movement of its other end on said chassis and the other arm pivotally connected at one end to said chassis and mounted for longitudinal movement of its other end on said body, the improved means for supporting said body on said scissors lift means and discharging material from said cargo carrying body which comprises: a pair of parallel longitudinal struts mounted on said body and forming a portion of the sub-floor of said body with said struts having elongated channels therein facing toward each other, a load supporting ramp mounted between said struts and having rollers on its opposite sides received in said channels for supporting said ramp and guiding it along a path of reciprocation between a discharge position with the ramp projecting outwardly from said body over said cab and a retracted position with the ramp closely underlying the floor of said body between said struts, and means for propelling said ramp along said path, said struts also having elongated cam surfaces thereon spaced away from said path of said ramp with said other ends of said other arms having rollers thereon in rolling engagement with said cam surfaces.

6. In an airplane loading vehicle having a ground engaging chassis, a cargo carrying body having a floor, and scissors lift means supporting said body on said chassis and including two spaced apart pairs of lift arms with each pair of arms pivotally connected together intermediate of their ends and with each pair of arms having one arm pivotally connected at one end to said body and mounted for longitudinal movement of its other end on said chassis and the other arm pivotally connected at one end to said chassis and mounted for longitudinal movement of its other end on said body, the improved means for supporting said body on said scissors lift means and discharging material from said cargo carrying body which comprises: a pair of elongated channel members of generally U-shaped cross-section mounted parallel to each other on the underside of said floor of said cargo carrying body with their open sides facing inwardly toward each other and with each channel member having a closed side facing downwardly away from said floor, a flanged wheel mounted on said other end of each of said other arms and in rolling engagement with each of said closed sides of said channel members, a load supporting ramp having an upper tread surface and opposite side edges with a pair of wheels mounted on each of said side edges and having hub portions received in closely fitting engagement in said open sides of said channel members and peripheral flanges surrounding said hub portions and positioned in closely fitting relation against said channel members adjacent to said open sides, and means for propelling said ramp between a discharge position projecting outwardly from said body and a retracted position with said upper tread surface closely underlying the floor of said body.

7. In an airplane loading and servicing vehicle, a cargo carrying body having a floor and a supporting sub-frame including a pair of elongated channel members of generally U-shaped cross-section mounted parallel to each other on the underside of said floor with their open sides facing inwardly toward each other, a load supporting ramp having an upper tread surface and opposite side edges with a pair of wheels mounted on each of said side edges and having hub portions received in closely fitting engagement in said open sides of said channel members and peripheral flanges surrounding said hub portions and positioned in closely fitting relation against said channel members adjacent to said open sides, and means for propelling said ramp between a discharge position projecting outwardly from said body and a retracted position with said upper tread surface closely underlying the floor of said body between said channel members.

References Cited in the file of this patent

UNITED STATES PATENTS

| | | |
|---|---|---|
| 1,884,513 | Barclay | Oct. 25, 1932 |
| 2,091,069 | Girl | Aug. 24, 1937 |
| 2,379,094 | Maxon | June 26, 1945 |
| 2,412,158 | Kuehlman et al. | Dec. 3, 1946 |
| 2,515,334 | Buye | July 18, 1950 |
| 2,696,925 | Le Laurin | Dec. 14, 1954 |
| 2,741,376 | Hinds | Apr. 10, 1956 |
| 2,764,869 | Scherr | Oct. 2, 1956 |
| 2,778,674 | Attenou | Jan. 22, 1957 |
| 2,792,137 | Solomon et al. | May 14, 1957 |
| 2,797,833 | Cash | July 2, 1957 |
| 2,883,079 | Binns | Apr. 21, 1959 |